(12) United States Patent
Lee et al.

(10) Patent No.: US 11,742,547 B2
(45) Date of Patent: Aug. 29, 2023

(54) BATTERY MODULE AND BATTERY PACK HAVING THE SAME

(71) Applicant: SK On Co., Ltd., Seoul (KR)

(72) Inventors: Gae Min Lee, Daejeon (KR); Dong Min Kim, Daejeon (KR); Yun Joo Noh, Daejeon (KR); Jun Hee Jung, Daejeon (KR)

(73) Assignee: SK On Co., Ltd., Seoul (KR)

( * ) Notice: Subject to any disclaimer, the term of this patent is extended or adjusted under 35 U.S.C. 154(b) by 62 days.

(21) Appl. No.: 17/167,173

(22) Filed: Feb. 4, 2021

(65) Prior Publication Data

US 2021/0249726 A1    Aug. 12, 2021

(30) Foreign Application Priority Data

Feb. 6, 2020    (KR) .......................... 10-2020-0014027

(51) Int. Cl.
*H01M 50/256*    (2021.01)
*H01M 50/209*    (2021.01)

(52) U.S. Cl.
CPC ....... *H01M 50/256* (2021.01); *H01M 50/209* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 2,510,596 A | 6/1950 | Murphy | |
| 2,638,490 A | 5/1953 | Snyder | |
| 8,689,918 B2 | 4/2014 | Yu et al. | |
| 2015/0024253 A1 | 1/2015 | Noh | |
| 2015/0064542 A1 | 3/2015 | Noh et al. | |
| 2017/0062783 A1* | 3/2017 | Kim | H01M 50/242 |
| 2018/0076426 A1 | 3/2018 | Kohler et al. | |
| 2020/0083502 A1* | 3/2020 | Fan | H01M 50/3425 |

FOREIGN PATENT DOCUMENTS

| | | |
|---|---|---|
| EP | 2605309 A1 | 6/2013 |
| KR | 1020150026609 A | 3/2015 |
| KR | 1020190049750 A | 5/2019 |

* cited by examiner

*Primary Examiner* — Carmen V Lyles-Irving
(74) *Attorney, Agent, or Firm* — THE WEBB LAW FIRM

(57) ABSTRACT

There is provided a battery module, in which a relatively wide contact area between an end plate and a lifting device may be secured when the battery module is elevated, the rigidity of the end plate may be sufficiently secured when the battery module is elevated, while forming a relatively thin end plate. The battery module includes a cell stack provided by stacking a plurality of battery cells, a module case accommodating the cell stack, an end plate disposed on front side and rear side of the module case, and a lifting support portion disposed on the end plate and having a support surface in surface contact with a lifting device.

13 Claims, 11 Drawing Sheets

BATTERY MODULE AND BATTERY PACK HAVING THE SAME

CROSS-REFERENCE TO RELATED APPLICATION

This application claims priority to Korean Patent Application No. 10-2020-0014027 filed Feb. 6, 2020, the disclosure of which is hereby incorporated by reference in its entirety.

BACKGROUND OF THE INVENTION

Field of the Invention

The present disclosure relates to a battery module for a secondary battery, and a battery pack including the same.

Description of Related Art

Unlike primary batteries, secondary batteries may be charged and discharged, and thus may be applied to devices within various fields such as digital cameras, mobile phones, notebook computers, and hybrid vehicles. Examples of secondary batteries include nickel-cadmium batteries, nickel-metal hydride batteries, nickel-hydrogen batteries, lithium secondary batteries, and the like.

Among such secondary batteries, a large amount of research into lithium secondary batteries having high energy density and discharge voltage is in progress, and recently, lithium secondary batteries have been configured in the form of a battery module provided by modularizing a number of battery cells manufactured as a can-type or pouch-type with flexibility and been used.

In the related art, when moving the battery module during the process of manufacturing the battery pack, the operator directly transported the battery module. However, as the capacity of the battery module gradually increases, the weight of the battery module increases, and accordingly, a method of moving the battery module using a lifting mechanism is used, rather than the operator directly transporting the battery module.

FIG. 1 is a perspective view of a battery module 10 according to the related art. As illustrated in FIG. 1, the battery module 10 according to the related art has a structure in which an end plate 30 is disposed on the front and rear of a module case 20.

To elevate the battery module 10, a lifting mechanism (not illustrated) having a ball screw and an actuator was used in the related art. To use such a lifting mechanism, in the battery module 10 according to the related art, as illustrated in FIG. 1, a protruding structure is formed on the front surface of the end plate 30, and a vertical lifting groove 31 is formed in a protruding portion of the end plate 30.

In the related art lifting mechanism, there is used a method in which after inserting an operating portion of the lifting mechanism into the lifting groove 31, a ball is pressed toward an inner circumferential surface of the lifting groove 31 by an actuator, so that the lifting groove 31 and the ball are brought into close contact with each other, and the battery module 10 is moved by raising and lowering the battery module 10 in a state in which such pressure and adhesion is applied.

However, in the lifting method according to the related art, since the weight of the battery module 10 is locally concentrated on the ball contact portion, rigidity (stiffness) of the lifting groove 31 is largely required. In detail, not only is the contact area between the ball of the lifting mechanism and the lifting groove 31 extremely small (similar to point contact), but also it is necessary to increase the rigidity of the lifting groove 31 in that the ball is pressed with relatively large force by the actuator. In addition, in a case in which the weight of the battery module 10 increases, there is a problem in that the number of lifting grooves 31 should be increased to increase the number of lifted portions.

To increase the rigidity of a portion of the lifting groove 31, the thickness of the end plate 30 corresponding to an outer side of the lifting groove 31 should be increased, and in addition to a thickness T1 of the end plate for coupling the module case 20 and the end plate 30, a minimum diameter (about 8 mm or more) of the lifting groove 31 is also required for the operation of the lifting mechanism. Thus, in this case, there may be a problem in which a total thickness T2 of the end plate 30 should be unnecessarily increased.

In this manner, the battery module 10 according to the related art has a problem in which the thickness of the end plate 30 becomes excessively thick for the lifting operation through the end plate 30, and accordingly, compared with the battery modules 10 having the same volume, there is a problem in that the space in which a battery cell may be mounted is reduced, thereby reducing the volume density.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a battery module in which a relatively wide contact area between an end plate and a lifting device may be secured when the battery module is elevated.

An aspect of the present disclosure is to provide a battery module in which the rigidity (stiffness) of an end plate may be sufficiently secured when the battery module is elevated, while forming a relatively thin end plate.

An aspect of the present disclosure is to provide a battery module in which the space of the battery module may be efficiently used, and a battery pack including the same.

According to an exemplary embodiment, a battery module includes a cell stack provided by stacking a plurality of battery cells, a module case accommodating the cell stack, an end plate disposed on front side and rear side of the module case, and a lifting support portion disposed on the end plate and having a support surface in surface contact with a lifting device.

The support surface may be provided as a horizontal surface, and a lower portion of the support surface has an open structure.

The lifting support portion may comprises a space portion exposed externally on the end plate.

The space portion may include an inner space provided under the support surface and configured to fit a contact portion of the lifting device the inner space, and an upper open space provided by penetrating through an outer end of the support surface in a vertical direction and configured to fit a vertical extension portion of the lifting device extending in the vertical direction from one end of the contact portion of the lifting device in the upper open space. The inner space and the upper open space may communicate with each other.

The upper open space may be respectively provided on both sides of the inner space, in such a manner that a pair of lifting device enters.

A center of the inner space may be provided with a central reinforcing rib extending vertically to increase rigidity of the support surface. In this case, the central reinforcing rib may be formed in parallel with a reinforcing rib provided on the end plate.

The module case may be configured to cover an upper surface of the end plate, and the module case and the upper surface of the end plate may be fastened to each other. In this case, a connector may be disposed on an upper surface of the module case.

A thickness of the support surface in a front-rear direction may have a value of 5 mm to 8 mm, and a width of the support surface in a left-right direction may have a value of 10 mm to 30 mm. In this case, a thickness of a portion in a front-rear direction, on which the lifting device contacts the support surface, may have a value of 5 mm or more, and a width of the portion in a left-right direction has a value of 10 mm or more.

The end plate may be provided with a reinforcing rib having a quadrangular grid shape formed in vertical and horizontal directions or a reinforcing rib having a hexagonal grid shape, to increase rigidity.

According to another exemplary embodiment, a battery pack includes the battery module described above, and a pack housing accommodating the battery module. The lifting support portion is disposed to face an inner wall surface of the pack housing.

The battery may further include a frame supporting the battery module. The module case of the battery module may be provided with a flange supported by the frame.

BRIEF DESCRIPTION OF THE DRAWINGS

The above and other aspects, features, and advantages of the present disclosure will be more clearly understood from the following detailed description, taken in conjunction with the accompanying drawings, in which:

FIGS. 6A and 6B are views illustrating an end plate illustrated in FIG. 2, in which FIG. 6A is a perspective view and FIG. 6B is a plan view of FIG. 6A;

DESCRIPTION OF THE INVENTION

Figure 1:
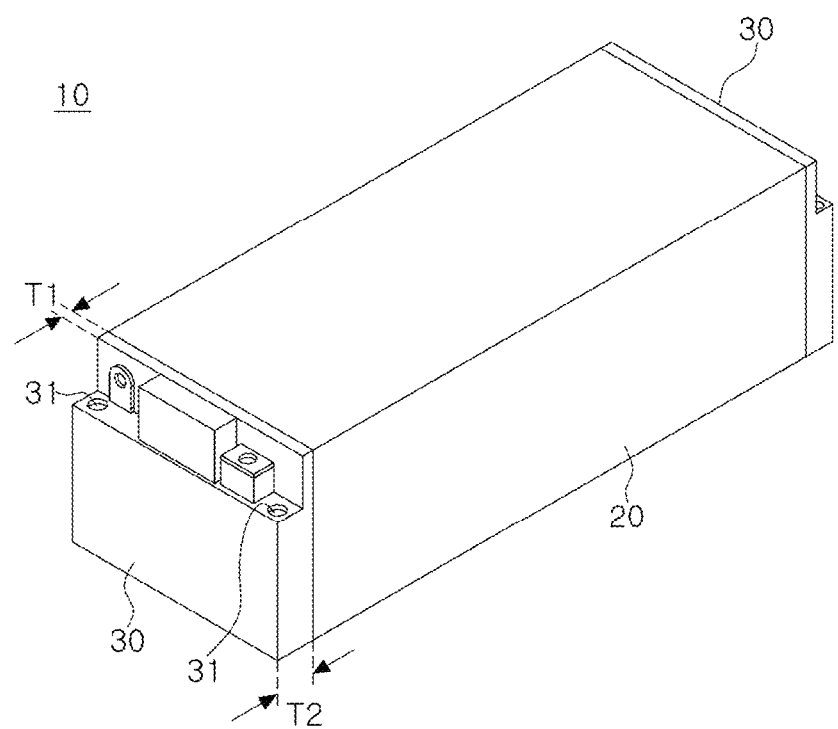
FIG. 1 is a perspective view of a battery module according to the related art.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiment s are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various manners as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depictions of elements in the drawings may be exaggerated for clarity, illustration, and convenience.

Hereinafter, a battery module 100 according to an exemplary embodiment of the present disclosure will be described with reference to FIGS. 2 to 7.

The battery module 100 according to an exemplary embodiment may be widely used in various devices requiring electricity storage, such as an energy storage system (ESS) as well as a vehicle.

Figure 2:
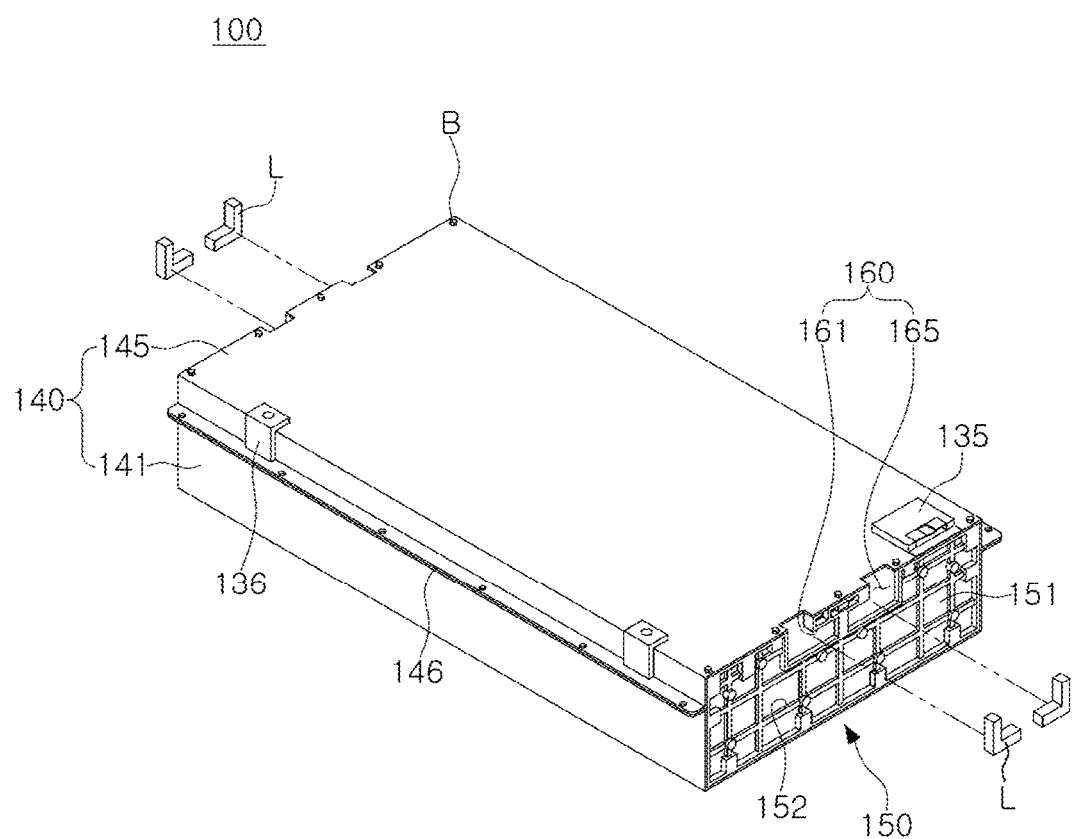
FIG. 2 is a perspective view of a battery module according to an exemplary embodiment of the present disclosure.
Figure 3:
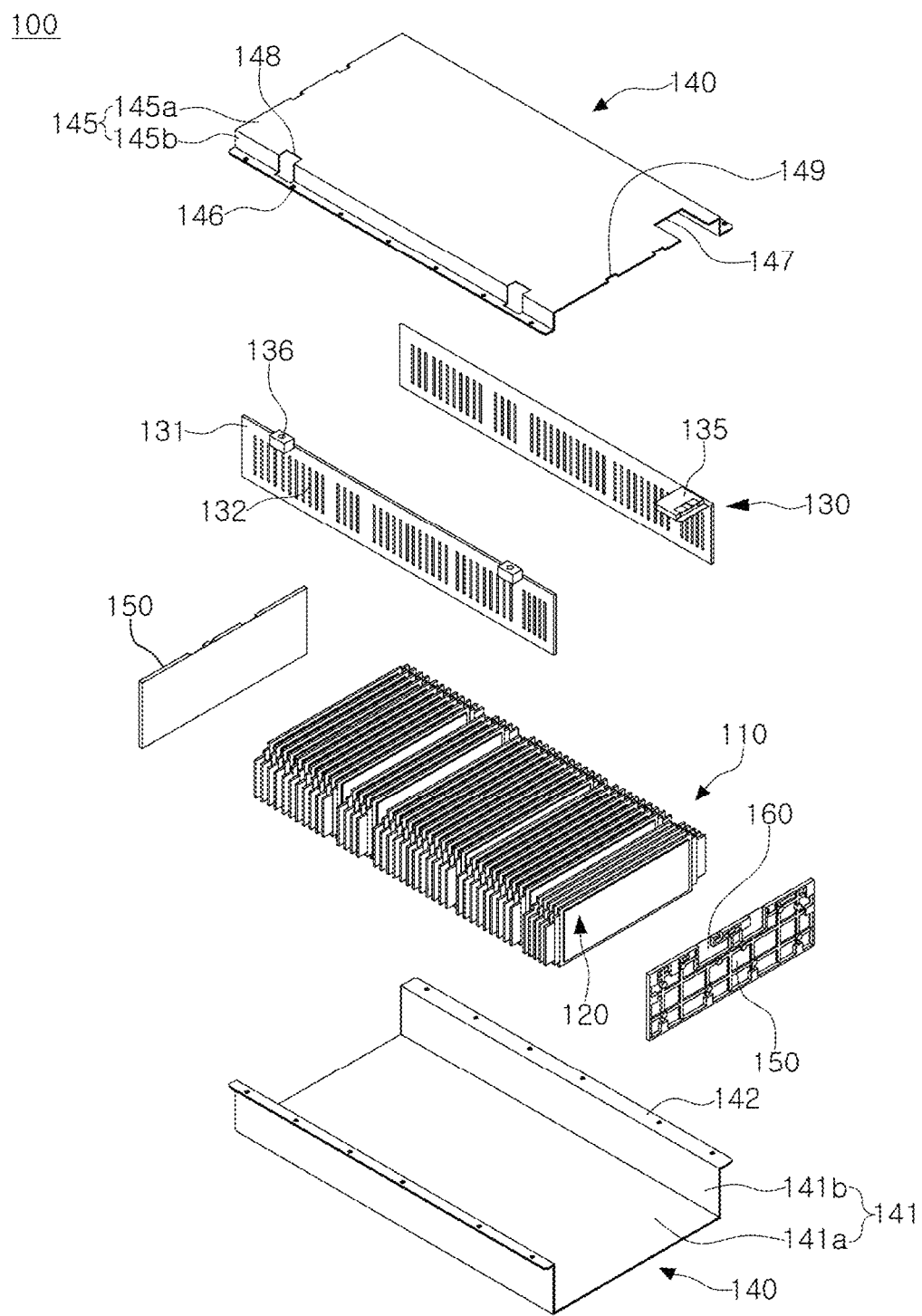
FIG. 3 is an exploded perspective view of the battery module illustrated in FIG. 2.
Figure 4:
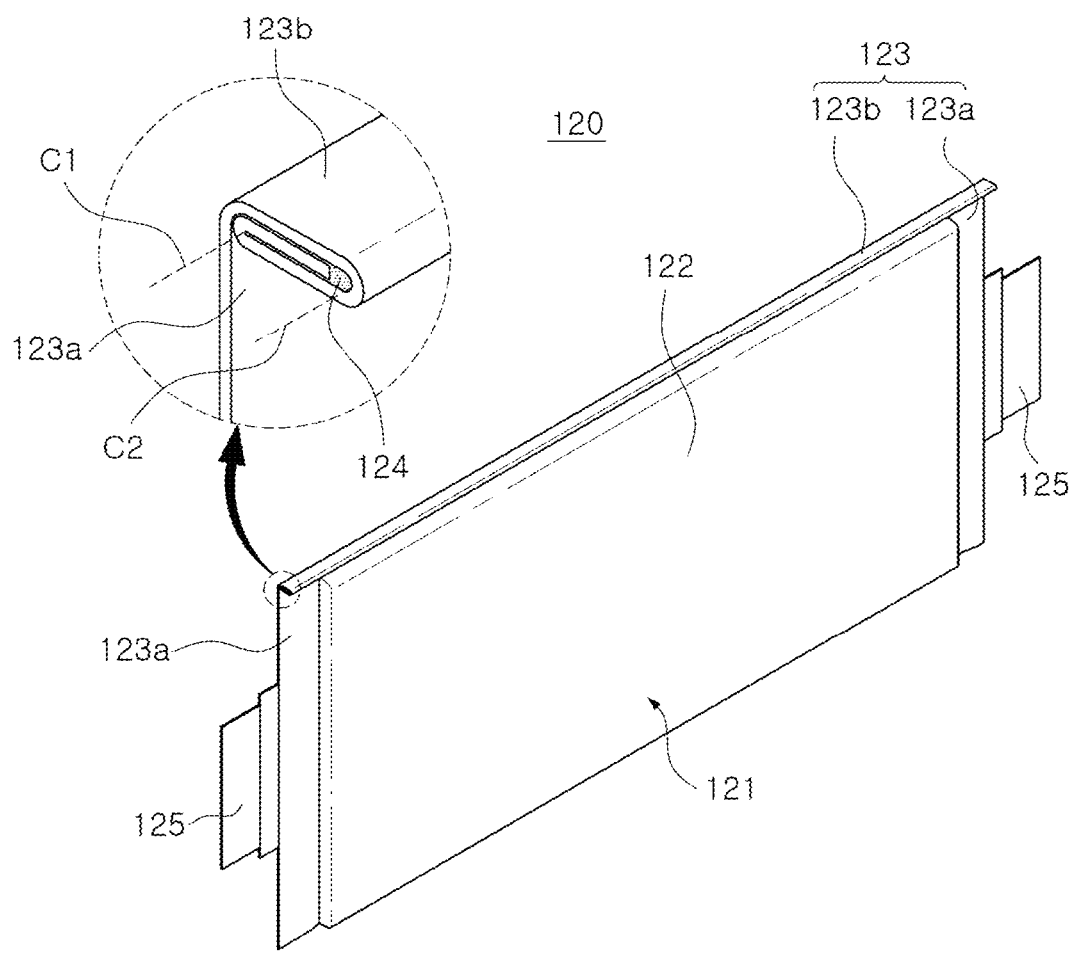
FIG. 4 is a perspective view of a battery cell illustrated in FIG. 2.
Figure 5:
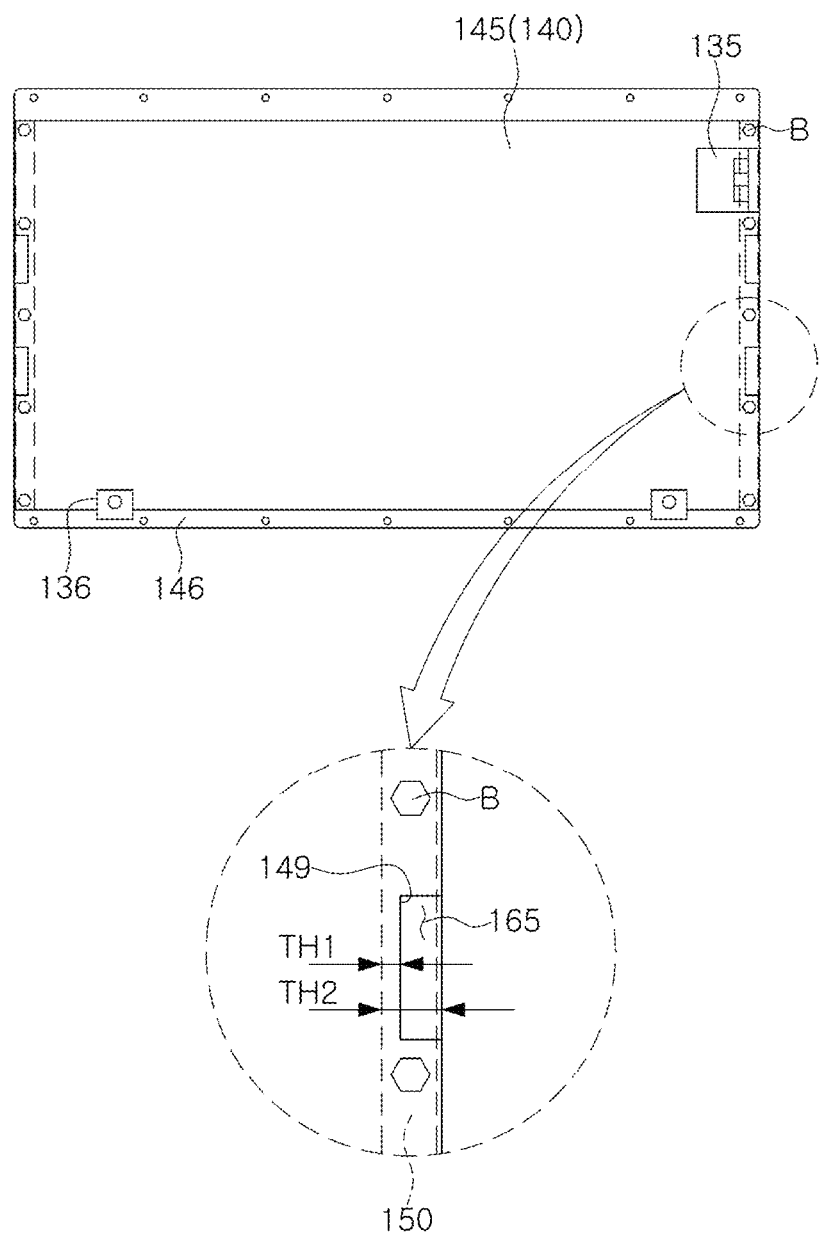
FIG. 5 is a plan view of the battery module illustrated in FIG. 2.
Figure 6A:
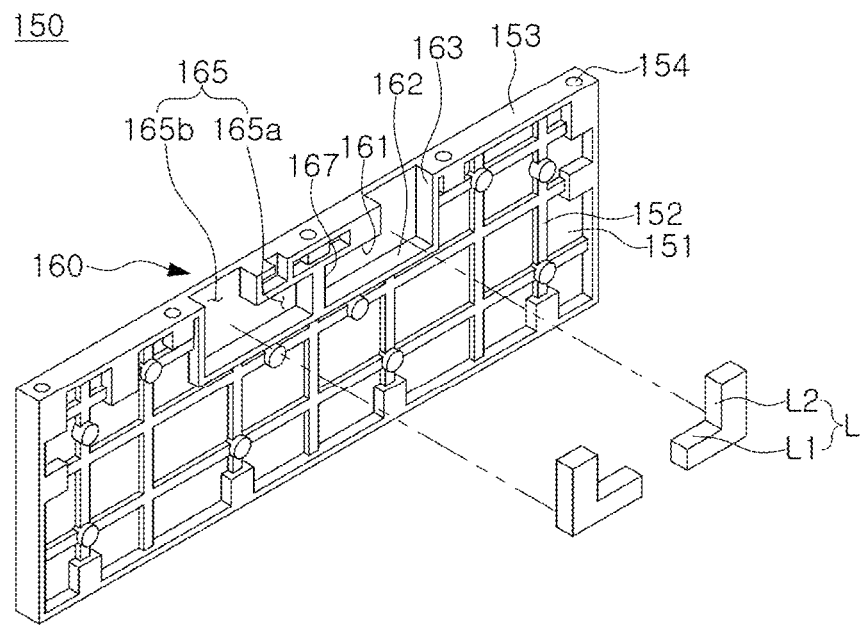
Figure 6B:
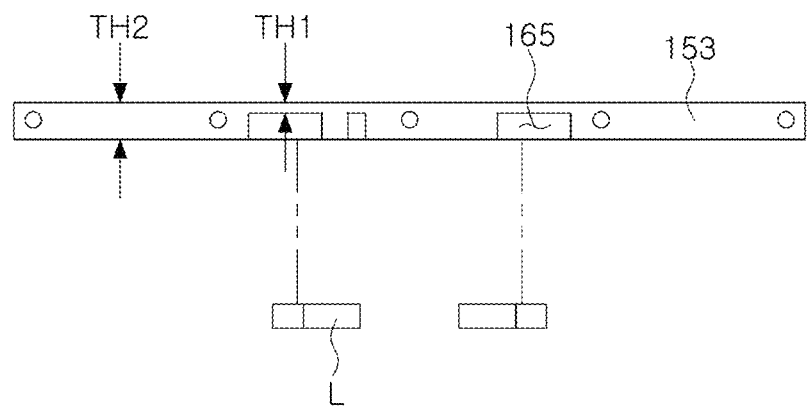
Figure 7:
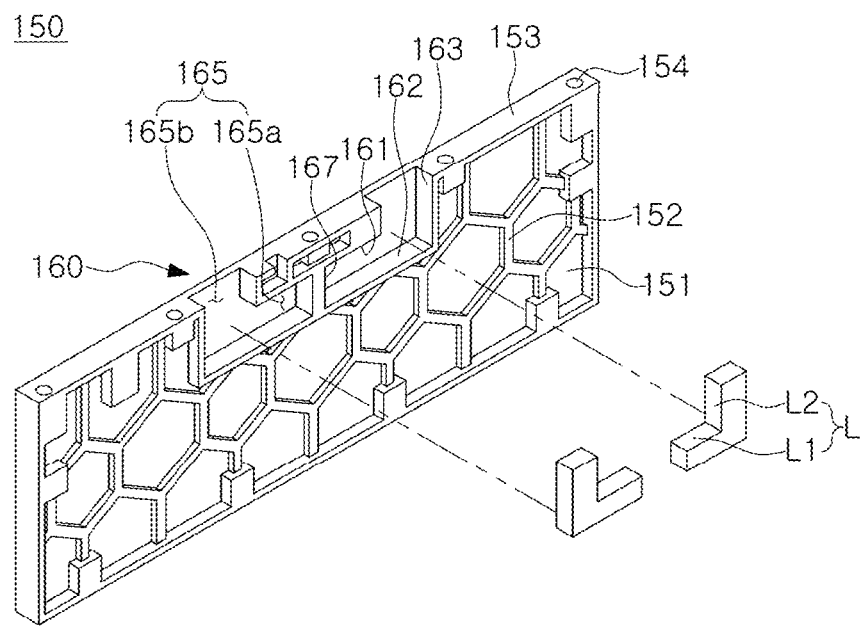
FIG. 7 is a perspective view of an end plate according to another embodiment of the present disclosure.

FIG. 2 is a perspective view of the battery module 100 according to an exemplary embodiment of the present disclosure, FIG. 3 is an exploded perspective view of the battery module 100 illustrated in FIG. 2, FIG. 4 is a perspective view of a battery cell 120 illustrated in FIG. 1, and FIG. 5 is a plan view of the battery module 100 illustrated in FIG. 2. FIGS. 6A and 6B illustrate an end plate 150 illustrated in FIG. 2. FIG. 6A is a perspective view and FIG. 6B is a plan view of FIG. 6A. FIG. 7 is a perspective view of an end plate 150 according to another embodiment of the present disclosure.

As illustrated in FIGS. 2 to 7, the battery module 100 according to an exemplary embodiment may be configured to include a cell stack 110, a module case 140, an end plate 150, and an lifting support portion 160, and may further include a busbar assembly 130.

As illustrated in FIG. 3, the cell stack 110 is configured by stacking a plurality of battery cells 120. In this embodiment, although the battery cells 120 are illustrated to be erected up and down and stacked in a left-right direction (or a horizontal direction), the battery cells 120 may also be configured to be laid on the left and right, to be vertically stacked, if necessary. Each battery cell 120 may be a pouch-type secondary battery, but may also be configured as a can-type secondary battery.

The battery cell 120 may be configured in a form in which an electrode assembly (not illustrated) and an electrolyte are accommodated in a pouch 121. The electrode assembly includes a plurality of electrode plates and electrode tabs and is accommodated in the pouch. In this case, the electrode plate is comprised of a positive electrode plate and a negative electrode plate, and the electrode assembly may be constructed to have a stacked form in which the positive electrode plate and the negative electrode plate are stacked with a separator therebetween so that wide surfaces thereof face each other. The positive electrode plate and the negative electrode plate are formed in a structure in which an active material slurry is applied to a current collector, and the slurry may be formed by stirring a particulate active material, an auxiliary conductor, a binder, a plasticizer, and the like together with an added solvent.

In addition, in the electrode assembly, a plurality of positive plates and a plurality of negative plates may be erected up and down and stacked in a horizontal direction. In this case, the plurality of positive plates and the plurality of negative plates are respectively provided with electrode tabs, and may be connected to electrode leads 125 (see FIG. 4) in such a manner that the same polarities are connected to each other.

Referring to FIG. 4, the battery cell 120 may be formed through a pouch 121. The pouch 121 may be divided into an accommodating portion 122 and a sealing portion 123. The receiving portion 122 is formed in a container shape to provide a quadrangular inner space. The electrode assembly and the electrolyte are accommodated in the inner space formed through the receiving portion 122.

The sealing portion 123 is a portion that seals the circumference of the receiving portion 122 by bonding a portion of the pouch 121. Accordingly, the sealing portion 123 is formed in a flange shape extending outwardly from the receiving portion 122 formed in a container shape, and is disposed along the outer periphery of the receiving portion 122. A heat-sealing method may be used for bonding the pouch 121 for forming the sealing portion 123, but is not limited thereto.

In addition, in this embodiment, the sealing portion 123 may be divided into a first sealing portion 123a in which the electrode lead 125 is disposed and a second sealing portion 123b in which the electrode lead 125 is not disposed.

In this embodiment, the pouch 121 may be formed by forming a single exterior material. In more detail, the pouch 121 may be completed by forming one or two accommodating portions on a single exterior material and then folding the exterior material so that the accommodating portions form one space, the receiving portion 122.

In this embodiment, the receiving portion 122 may be formed in a quadrangular shape. In addition, the sealing portion 123 formed by bonding an exterior material is provided on the outer periphery of the receiving portion 122. However, as described above, it is not necessary to form the sealing portion 123 on the surface on which the pouch 121 is folded. Therefore, in this embodiment, the sealing portion 123 is formed on the outer periphery of the receiving portion 122, and is provided only on three surfaces of the receiving portion 122, and the sealing portion 123 may not be disposed on any one surface of the outer peripheries of the receiving portion 122.

In this embodiment, since the electrode leads 125 are disposed to face in opposite directions, the two electrode leads 125 are disposed on the sealing portions 123 formed on different sides. Accordingly, the sealing portion 123 of this embodiment is comprised of two first sealing portions 123a in which the electrode lead 125 is disposed, and one second sealing portion 123b in which the electrode lead 125 is not disposed. In FIG. 4, the second sealing portion 123b is illustrated to be formed on the upper surface of the pouch 121, but the second sealing portion 123b may also be formed on the lower surface of the pouch 121.

In addition, in the battery cell 120 of this embodiment, to increase the bonding reliability of the sealing portion 123 and to significantly reduce the area of the sealing portion 123, the sealing portion 123 may be formed to be folded at least once.

In more detail, of the sealing portion 123 according to this embodiment, the second sealing portion 123b on which the electrode lead 125 is not disposed may be folded twice and then fixed by the adhesive member 124. For example, the second sealing portion 123b may be folded 180° along a first bending line C1 illustrated in FIG. 4 and then folded again along a second bending line C2 illustrated in FIG. 4. In this case, the adhesive member 124 may be filled inside of the second sealing portion 123b, and thus, the shape of the second sealing portion 123b folded twice may be maintained by the adhesive member 124. The adhesive member 124 may be formed of an adhesive having relatively high thermal conductivity. For example, the adhesive member 124 may be formed of epoxy or silicon, but the material is not limited thereto.

The module case 140 is configured to accommodate the cell stack 110. The module case 140 may be formed by combining a first case 141 positioned at a lower portion and a second case 145 positioned at an upper portion. In this case, the first case 141 may be comprised of a flat portion 141a and side portions 141b extending in a vertical direction from both ends of the flat portion 141a, and the second case 145 may be comprised of a flat portion 145a, and side portions 145b extending in the vertical direction from both ends of the flat portion 145a. However, the shape of the module case 140 is not limited thereto, and may be variously changed as long as four surfaces (upper, lower, left and right surfaces) of the cell stack 110 may be accommodated. As an example, the module case 140 may also be configured to have a cross-sectional shape in which one side thereof is open, for example, be comprised of a U-shaped plate having a U-shaped cross-section (including an angled shape at a corner) and a straight plate that is combined with the U-shaped plate to form an inner space.

Figure 8:
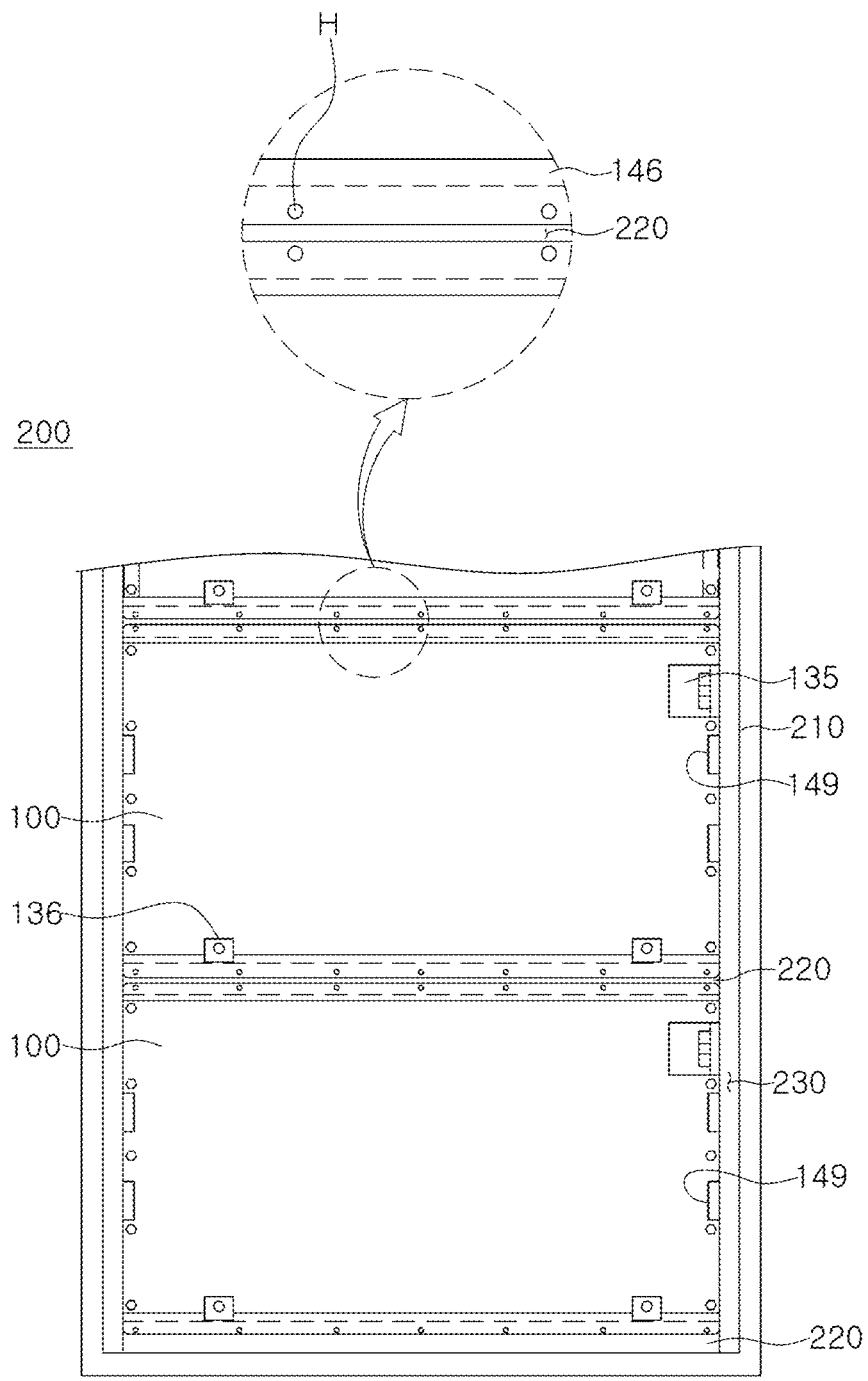
FIG. 8 is a simplified plan view illustrating an internal structure of a battery pack according to an exemplary embodiment of the present disclosure.

In addition, the module case 140 may include flanges 142 and 146 to be mounted on a support frame 220 of a battery pack 200 to be described later. For example, the module case 140 may include a first flange 142 extending from the first case 141 and a second flange 146 extending from the second case 145. Holes (H) for fastening the module case 140 to the support frame 220 may be formed in the flanges 142 and 146 as illustrated in FIG. 8 to be described later.

In addition, an upper surface of the second plate 145 may be provided with a terminal penetrating portion 148, through which a connection terminal 136 provided on the busbar assembly 130 to be described later penetrates to be exposed externally, and a connector penetrating portion 147 through which a connector 135 penetrates to be exposed externally.

In addition, the busbar assembly 130 may be interposed between the module case 140 and the cell stack 110.

The busbar assembly 130 is coupled to one or both surfaces of the battery cell 120, on which the electrode leads 125 of the battery cell 120 are disposed. The electrode leads 125 penetrate through a body 131 of the busbar assembly 130 to be connected to each other on the outside of the busbar assembly 130. To this end, the busbar assembly 130 may be provided with a plurality of through-holes 132 into which the electrode leads 125 are inserted.

In addition, the busbar assembly 130 may be provided with the connection terminal 136 for external connection. Accordingly, the battery cell 120 may be electrically and externally connected through the connection terminal 136, and to this end, the electrode lead 125 may be electrically connected to the connection terminal 136 through a circuit wiring (not illustrated) provided in the busbar assembly 130. Such circuit wiring may perform electrical connection according to serial/parallel connection of modules through the busbar formed of copper material.

The connection terminal 136 is exposed externally through the terminal penetrating portion 148 formed in the module case 140. Accordingly, the terminal penetrating portion 148 of the module case 140 may be formed to have a size corresponding to the size and shape of the connection terminal 136.

In addition, the busbar assembly 130 may include a circuit board (for example, a PCB), and a plurality of electronic devices such as a sensor and the like mounted on the circuit board, and thus, may perform the function of sensing the voltage of the battery cell 120. To this end, the connector 135 is connected to the busbar assembly 130. The connector 135 is exposed externally through the connector penetrating portion 147 formed in the module case 140. Accordingly, the connector penetrating portion 147 of the module case 140 may be formed to have a size corresponding to the size and shape of the connector 135.

The end plate 150 is disposed on the open front and rear sides of the module case 140 and is coupled to the front and rear sides of the module case 140, respectively, to form the appearance of the battery module 200 together with the module case 140.

The end plate 150 may be provided with a reinforcing rib 152 to increase rigidity. For example, the end plate 150 may improve overall structural rigidity through the reinforcing ribs 152 formed to be thicker than the thickness of the body 151. In this case, the reinforcing rib 152 may have a shape of quadrangular grids formed in an up-down (vertical) direction and a left and right (horizontal) direction, as illustrated in FIG. 6A, and may have a hexagonal grid shape as illustrated in FIG. 7.

Referring to FIGS. 2 and 5, the module case 140 may be configured to cover an upper surface 153 of the end plate 150. To this end, a fastening aperture 154 for fastening may be formed in the upper surface 153 of the end plate 150. Therefore, the module case 140 and the upper surface 153 of the end plate 150 may be fastened by a bolt (B) or the like therebetween.

Referring to FIGS. 6A and 7, the lifting support portion 160 is formed on the end plate 150 and may have a support surface 161 in surface contact with an lifting device L. For example, a contact portion L1 of the lifting device L may be in surface contact with the support surface 161 in a relatively wide area.

In addition, the support surface 161 is formed as a horizontal surface, and a lower portion of the support surface 161 has an open structure in which the lifting device L may enter.

In this manner, the lifting support portion 160 is formed on the outer surface of the end plate 150, and may be formed in a space portion 165 exposed externally of the end plate 150 so that the lifting device L may enter.

In addition, the lifting device L may be comprised of a contact portion L1 in contact with the support surface 161 and a vertical extension portion L2 extending in the vertical direction from one end of the contact portion L1. For example, the lifting device L may form an overall 'L' shape.

To correspond to the shape of the lifting device L, the space portion 165 corresponding to one lifting device L may have an overall 'L' shape, in such a manner that the lifting device L may enter the space portion 165. For example, the space portion 165 may include an inner space 165a formed under the support surface 161 in such a manner that the contact portion L1 of the lifting device L may enter the lower portion of the support surface 161, and an upper open space 165b formed by penetrating vertically at an outer end of the support surface 161 in such a manner that the vertical extension portions L2 of the lifting device L may enter. The inner space 165a and the upper open space 165b may have a communication structure. In addition, the space portion 165 may have a shape surrounded by a lower surface 162, a side surface 163, and the support surface 161. To form the upper open space 165b, a concave groove 149 may be formed in the module case 140.

On the other hand, the end plate 150 provided on one side of the module case 140 is supported by two lifting devices L, and the end plate 150 provided on the other side is also supported by two lifting devices L. For example, the module case 140 may be supported by a total of four lifting devices L.

Accordingly, the upper open space 165b may be provided on both sides of the inner space 165a so that the end plate 150 may be supported by the two lifting devices L, respectively. Accordingly, the space portion 165 may have a shape in which two 'L's are symmetrical.

In addition, since the space portion 165 and the support surface 165 formed thereby are formed in a central portion of the end plate 150, stress may be concentrated in the central portion of the end plate 150 when elevating the battery module 100 by the lifting device L. In consideration of this point, a central reinforcing rib 167 extending in the vertical direction may be provided in the center of the inner space 165a to increase the rigidity of the end plate 150. The central reinforcing rib 167 may be formed in parallel with a reinforcing rib 152 provided on the end plate 150. This central reinforcing rib 167 may have a structure disposed in a straight line with the reinforcing rib 152 formed in the vertical direction in the end plate 150, as illustrated in FIG. 6A, to resist the concentration of stress applied to the end plate 150.

Referring to FIGS. 5 and 6B, the endplate 150 has the fastening aperture 154 formed in a portion thereof corresponding to a total thickness (TH2, for example 10 mm), and a thickness (TH1, for example 3 mm) of a portion thereof in which the space portion 165 is formed is formed to be less than the total thickness (TH2). Accordingly, a thickness (e.g., 7 mm) of the support surface 161 in the front-rear direction has a value obtained by subtracting the thickness TH1 of the portion in which the space portion 165 is formed from the total thickness TH2 of the end plate 150. In this case, the thickness of the support surface 161 in the front-rear direction may have a value of 5 to 8 mm. In addition, referring to FIG. 6A, a horizontal width of the one side support surface 161 corresponding to one lifting device L may have a value of 10 to 30 mm. In addition, to correspond to the size of the support surface 161, a portion of the support surface 161 in contact with the contact portion L1 of the lifting device L may have a thickness of 5 mm or more in the front-rear directions to secure a minimum contact area, and may have a width of 10 mm or more in the left-right direction.

In this manner, by forming the space portion 165 in which the lifting device L may enter in the region in which the fastening aperture 154 is not formed, while securing the thickness in which the fastening aperture 154 is formed in the upper surface 153 of the end plate 150; a sufficient thickness of the support surface 161 may be secured.

Therefore, in a state in which the module case 140 covers the upper surface 153 of the end plate 150, the module case 140 and the upper surface 153 of the end plate 150 may be fastened with the bolt (B) or the like, and thus, the thickness of the end plate 150 may be prevented from increasing to fasten the module case 140 and the end plate 150.

In this manner, by forming the space portion 165 through which the lifting device L may enter and the lifting support portion 160 having the support surface 161 in contact with the lifting device L, in the end plate 150, since the contact area between the end plate 150 and the lifting device L may be increased at the time of elevating by the lifting device L, the thickness of the end plate 150 may be reduced and rigidity of the end plate 150 may also be sufficiently secured when the battery module 100 is elevated.

In addition, since the thickness of the end plate 150 may be reduced, the number of battery cells 120 that may be accommodated in the battery module 100 may be increased compared to the related art battery module (see 10 of FIG. 1) having the same volume. Therefore, the space efficiency of the battery module 100 may be increased.

Figure 9:
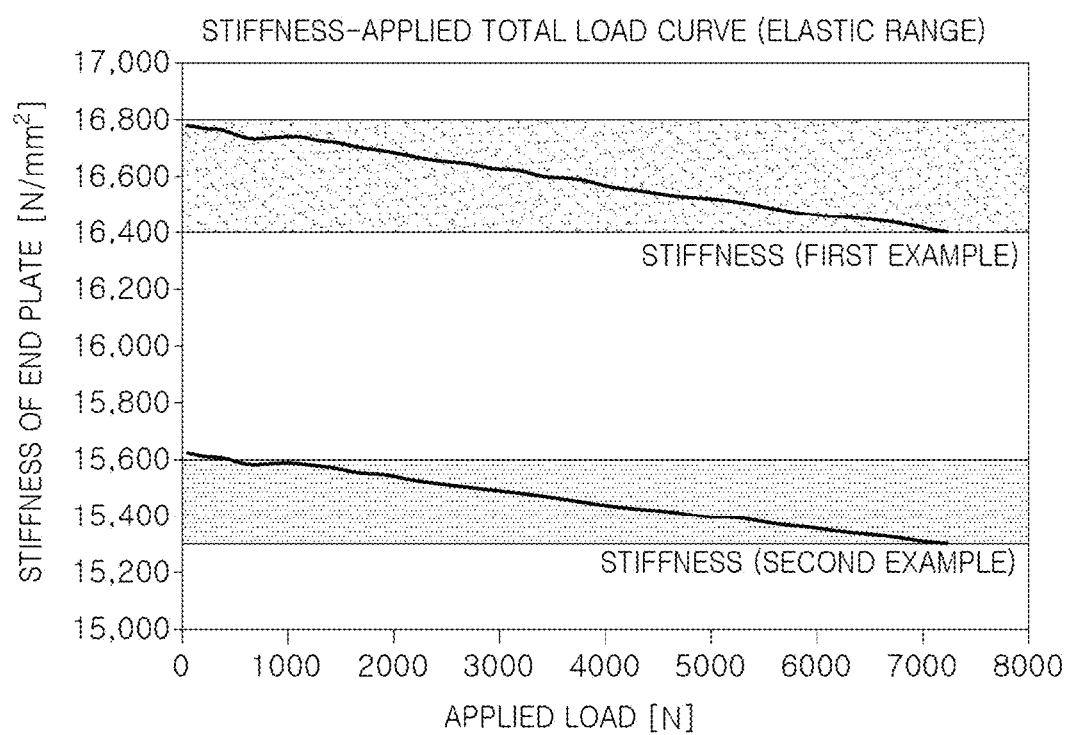
FIG. 9 is a graph illustrating the change in rigidity depending on applied loads of the end plate illustrated in FIG. 6A and the end plate illustrated in FIG. 7.
Figure 10A:
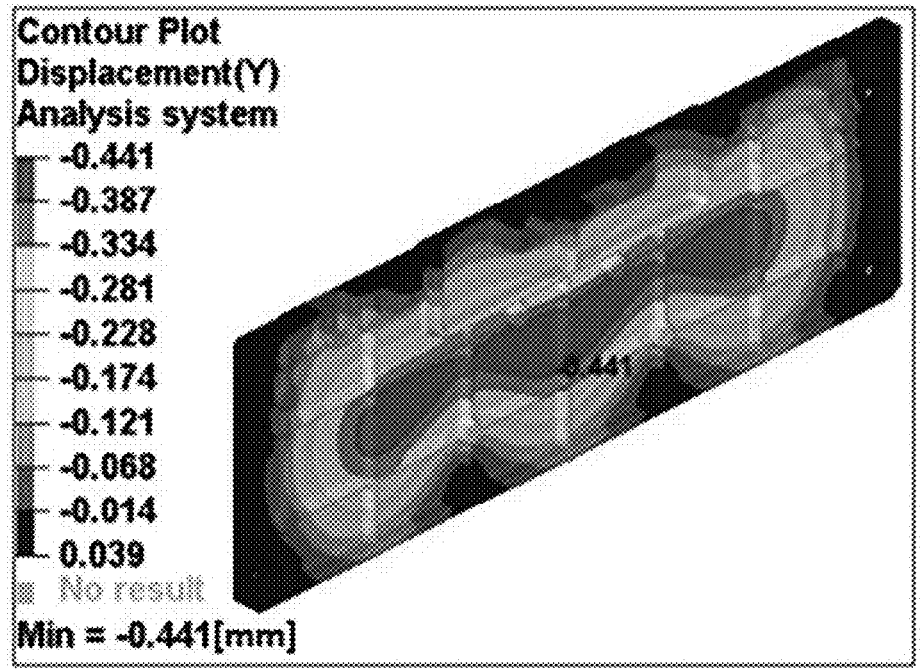
FIGS. 10A and 10B are graphs illustrating a simulation of displacement and stress during lifting with respect to the end plate illustrated in FIG. 6A.
Figure 10B:
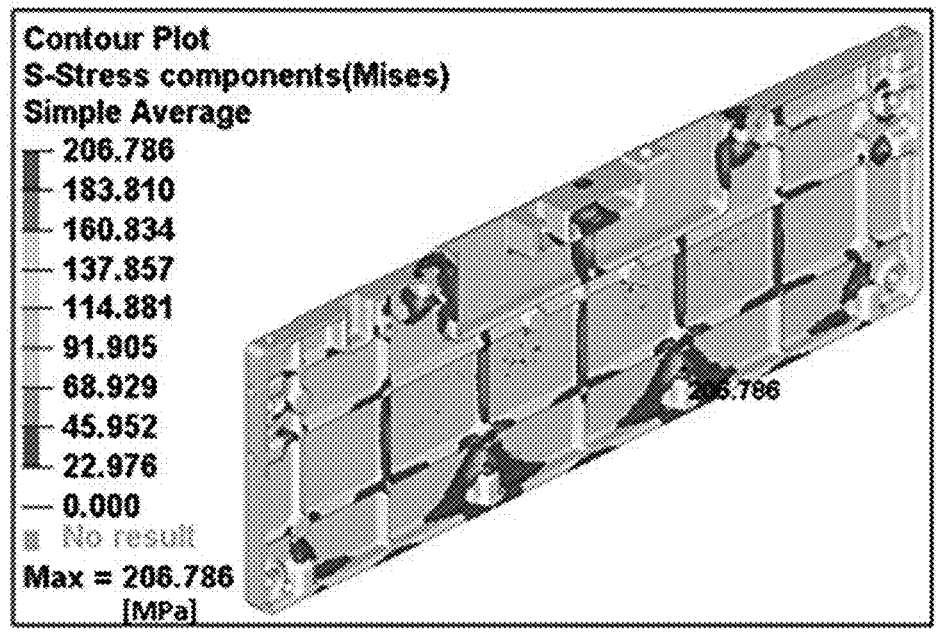
Figure 11A:
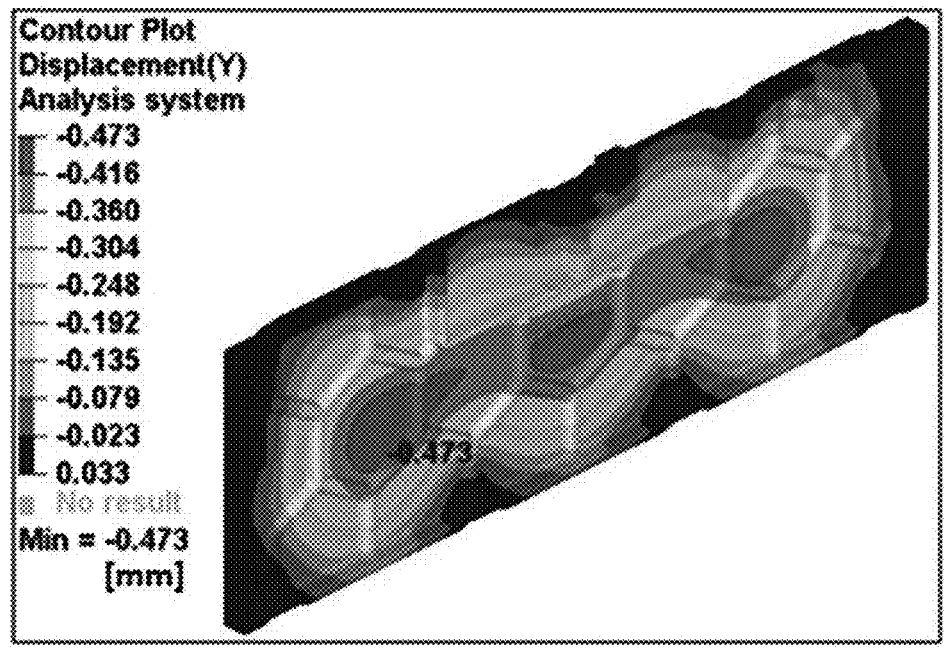
FIGS. 11A and 11B are graphs illustrating a simulation of displacement and stress during lifting with respect to the end plate illustrated in FIG. 7.
Figure 11B:
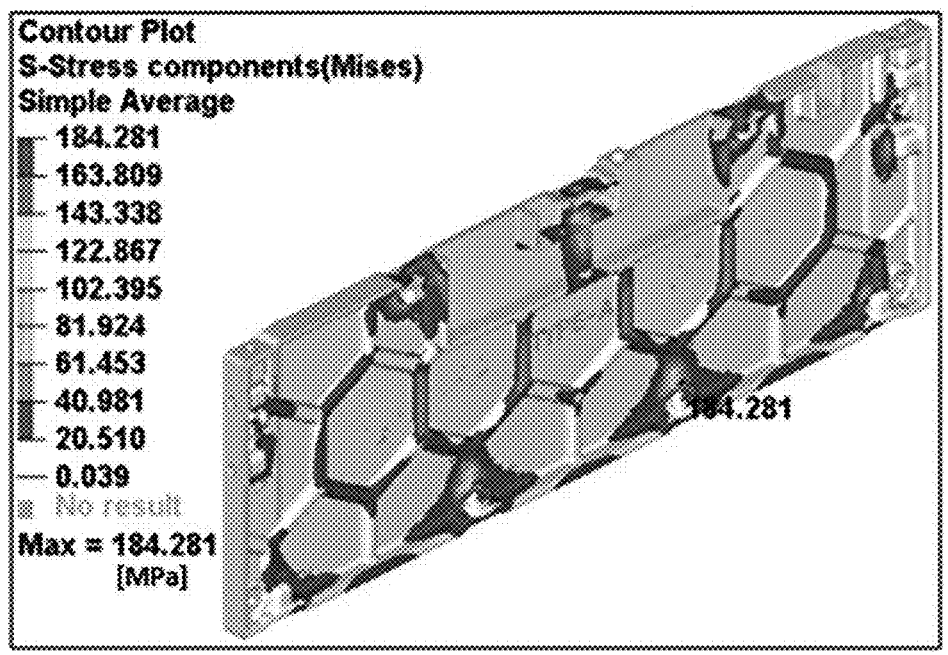

In the rigidity (stiffness) graph illustrated in FIG. 9, the first embodiment is for the quadrangular grid shape illustrated in FIG. 6A, and the second embodiment is for the hexagonal grid shape illustrated in FIG. 7. Compared with the first embodiment and the second embodiment in FIG. 9, the rigidity of the quadrangular grid shape in the first embodiment may have a value of about 107%, compared to the rigidity of the hexagonal grid shape in the second embodiment, and thus, it can be seen that the rigidity of the quadrangular grid shape illustrated in FIG. 6A is more excellent. However, in the case of the first and second embodiments, it can be confirmed that since the rigidity (stiffness) value of the end plate 150 is 15000 $N/mm^2$ or more, both embodiments have sufficient rigidity. In FIGS. 10A and 10B illustrating by simulating displacement and stress during lifting with respect to the end plate illustrated in FIG. 6A, and in FIGS. 11A and 11B illustrating the simulation of displacement and stress during lifting with respect to the end plate illustrated in FIG. 7, it can be seen that the values of displacement and stress are less than the limit values, and the structural characteristics of the lifting support portion 160 are improved.

Next, a battery pack 200 according to another embodiment will be described with reference to FIG. 8.

The battery pack 200 according to an exemplary embodiment may be widely used in various devices requiring electricity storage, such as an energy storage system (ESS), as well as a vehicle.

FIG. 8 is a simplified plan view illustrating the internal structure of the battery pack 200 according to an exemplary embodiment.

As illustrated in FIG. 8, the battery pack 200 may be configured to include the battery module 100 described with reference to FIGS. 2 to 7, a pack housing 210 accommodating the battery module 100, and a support frame 220 supporting the battery module 100. In this case, the lifting support portion 160 may be disposed to face the wall surface of the pack housing 210. Therefore, the lifting device L may advance and retreat through a space 230 formed between the pack housing 210 and the battery module 100, and various wires for the connection of the connection terminal 136 and the connector 135 may be installed in the space 230.

In addition, the battery module 100 may be installed on the support frame 220 through the flanges 142 and 146. In this case, the flanges 142 and 146 formed on the battery module 100 and the flanges 142 and 146 formed on an adjacent battery module 100 may have a structure supported by the support frame 220.

As set forth above, according to an exemplary embodiment providing the configuration as described above, an effect of securing a relatively wide contact area between the end plate and the lifting device when the battery module is elevated may be obtained.

In addition, according to an exemplary embodiment, there may be an effect that the rigidity of the end plate may be sufficiently secured when the battery module is elevated while the thickness of the end plate is formed to be thin.

In addition, according to an exemplary embodiment, an effect of efficiently using the space of the battery module and the battery pack may be obtained.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery module comprising:
   a cell stack provided by stacking a plurality of battery cells;
   a module case accommodating the cell stack;
   an end plate disposed on front side and rear side of the module case; and
   a lifting support portion disposed on the end plate and having a support surface in surface contact with a lifting device,
   wherein the lifting support portion is exposed externally on the battery module,
   wherein the lifting support portion comprises a space portion exposed externally on the end plate,
   wherein the space portion comprises:
   an inner space provided under the support surface and configured to fit a contact portion of the lifting device in the inner space; and
   an upper open space provided by penetrating through an outer end of the support surface in a vertical direction and configured to fit a vertical extension portion of the lifting device extending in the vertical direction from one end of the contact portion of the lifting device in the upper open space,
   wherein the inner space and the upper open space communicate with each other.

2. The battery module of claim 1, wherein the support surface is provided as a horizontal surface, and a lower portion of the support surface has an open structure.

3. The battery module of claim 1, wherein the upper open space is respectively provided on both sides of the inner space, in such a manner that a pair of lifting device enters.

4. The battery module of claim 3, wherein a center of the inner space is provided with a central reinforcing rib extending vertically to increase rigidity of the support surface.

5. The battery module of claim 4, wherein the central reinforcing rib is formed in parallel with a reinforcing rib provided on the end plate.

6. The battery module of claim 1, wherein the module case is configured to cover an upper surface of the end plate, and
   the module case and the upper surface of the end plate are fastened to each other.

7. The battery module of claim 6, wherein a connector is disposed on an upper surface of the module case.

8. The battery module of claim 1, wherein a thickness of the support surface in a front-rear direction has a value of 5 mm to 8 mm, and a width of the support surface in a left-right direction has a value of 10 mm to 30 mm.

9. The battery module of claim 8, wherein a thickness of a portion in a front-rear direction, on which the lifting device contacts the support surface, has a value of 5 mm or more, and a width of the portion in a left-right direction has a value of 10 mm or more.

10. The battery module of claim 1, wherein the end plate is provided with a reinforcing rib having a quadrangular grid shape formed in vertical and horizontal directions, to increase rigidity.

11. The battery module of claim 1, wherein the end plate is provided with a reinforcing rib having a hexagonal grid shape, to increase rigidity.

12. A battery pack comprising:
   the battery module of claim 1; and
   a pack housing accommodating the battery module,
   wherein the lifting support portion is disposed to face a wall surface of the pack housing.

13. The battery pack of claim 12, further comprising:
   a frame supporting the battery module,
   wherein the module case of the battery module is provided with a flange supported by the frame.

* * * * *